March 9, 1954 B. H. DUNMYER ET AL 2,671,833
PRESSURE RESPONSIVE APPARATUS
Filed June 13, 1950 2 Sheets-Sheet 1

INVENTOR.
BRUCE H. DUNMYER
LOUVAN E. WOOD
BY Robert J. Peck
ATTORNEY

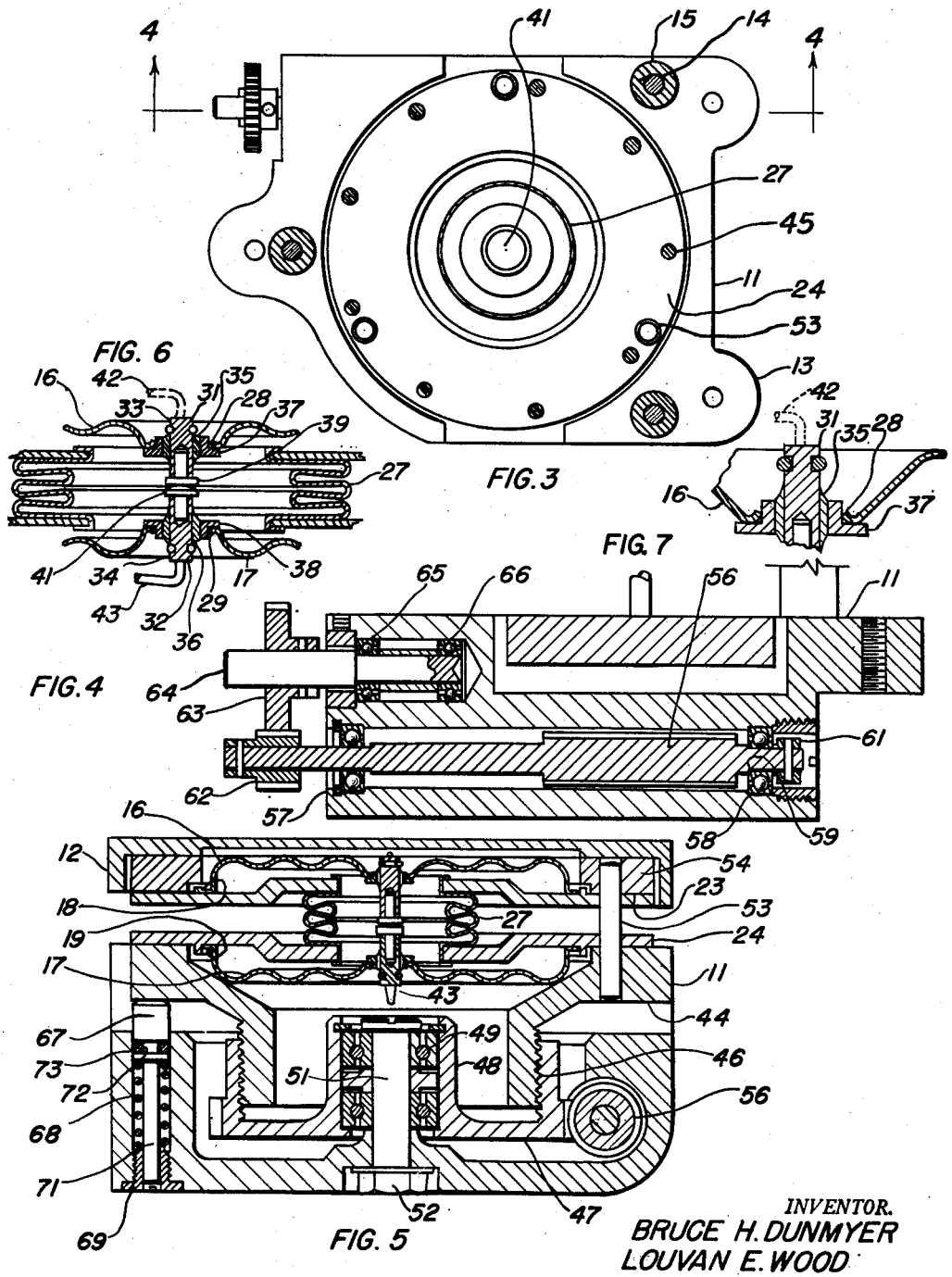

Patented Mar. 9, 1954

2,671,833

UNITED STATES PATENT OFFICE 2,671,833

PRESSURE RESPONSIVE APPARATUS

Bruce H. Dunmyer, Baltimore, and
Louvan E. Wood, Glen Arm, Md.

Application June 13, 1950, Serial No. 167,746

26 Claims. (Cl. 200—81.5)

1

The present invention relates to a novel form of pressure responsive apparatus in which electrical switching may be accomplished at predetermined values of pressure over a wide range of ambient fluid pressure.

Normally, the apparatus of the subject invention is used in connection with devices subjected to a wide range of atmospheric pressure, that is to say, with devices that are subject to use over a wide range in altitude above the earth's surface. In such applications, it is a requirement that means be provided for making or breaking an electrical circuit at a predetermined altitude corresponding to a value of atmospheric pressure and such means must incorporate provisions for adjusting the control effect on an electrical circuit over a wide range of altitude corresponding to a wide range of atmospheric pressure. The subject invention embodies the above mentioned means and accomplishes the results required with a minimum degree of error.

As is well known in the art of atmospheric pressure responsive devices, the accuracy of response is materially affected by amibent temperature variation, particularly when the device must respond accurately over many thousands of feet variation in altitude. Moreover, in many applications, there may be material vibrational and gravity forces associated with the use of the device which affect the accuracy of response and which of necessity imposes the use of a very rugged design, free from the influences of the vibrational and gravity forces, and compatible with an accuracy of response on the order of ±2 millibars' pressure over a range in altitude of about 20,000 feet.

The pressure responsive apparatus disclosed herein embodies novel features of design intended to substantially eliminate errors resulting from temperatures and vibrational and gravity forces. Symmetry and balance have been incorporated into the design along with critical and delicate response accompanied by extreme ruggedness. Moreover, the device is adjustable over a wide range of pressure corresponding to a wide range in altitude, and the design is such that performance is substantially unchanged over the wide range of atmospheric conditions and physical forces to which the device is inherently subjected.

The salient feature of design resides in the use of an expansible chamber having resilient end walls suitably maintained in substantially spaced parallel relationship. The end walls are in the form of identical dish shaped diaphragms of thin resilient metal and each wall moves in response to changes in fluid pressure, the walls moving in opposite directions for like changes in pressure. The interior volume confined by the end walls is substantially completely evacuated whereby the expansible chamber functions as an aneroid cell and this interior volume contains electrical switching means adapted to be actuated in response to movement of the end walls. One of the end walls is moveable, with respect to the other end wall, independently of changes in fluid pressure whereby the switching action can be selectively set at a predetermined pressure over a wide range of pressure. A relatively heavy and sturdy frame supports the resilient end walls and adjustment mechanism so that an integral device is provided. Normally, the resilient end walls are interconnected by means of a resilient side wall in the form of a metallic bellows inherently capable of changing in length to permit adjustment of the end walls for particular values of pressure.

The overall design and operation of the switch, together with an explanation of all of the design details contributing to the success of the novel arrangement disclosed, will be clearly understood upon reference to the specification following below when taken in conjunction with the drawings annexed hereto, in which:

Fig. 3 is a sectional view, in plan, taken along the lines 3—3 in Figure 2.

Fig. 4 is a sectional view, in elevation, taken along the lines 4—4 in Figure 3 and showing the means for adjusting the apparatus.

Fig. 5 is a slightly exploded sectional view, in elevation, taken along the lines 5—5 in Figure 1, and Figs. 6 and 7 are exploded views of a portion of the view shown in Figure 2, illustrating, for the sake of clarity, the electrical contact assembly and associated parts.

Figure 1:
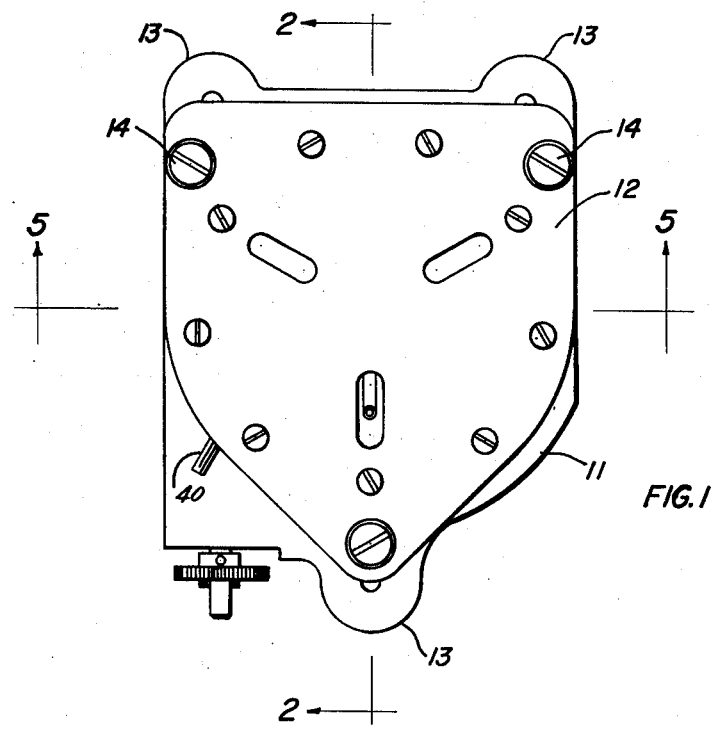
Fig. 1 is a plan view of the complete assembly of the invention disclosed.

First referring to Figure 1, we see a plan view of the complete assembly consisting of a two part frame comprising a cast base 11 and cap 12. The base 11 has suitably apertured ears 13 for mounting on any associated equipment. The cap 12 is secured to and spaced from the base 11 by means of a plurality of bolts 14 and spacers 15. Suitable apertures are provided in the base 11 and cap 12 for receiving the bolts 14 and spacers 15, the apertures in base 11 threadably engaging bolts 14.

Figure 2:
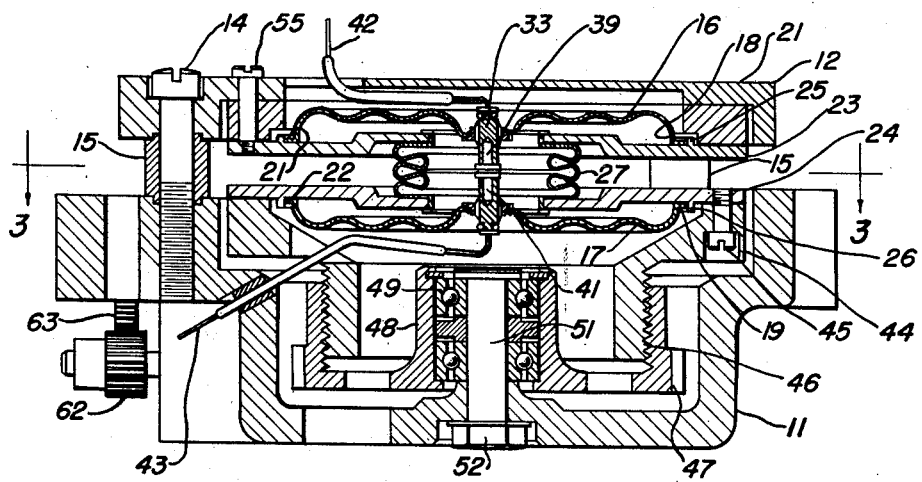
Fig. 2 is a slightly exploded sectional view, in elevation, taken along the line 2—2 of Figure 1.

Figure 2 clearly shows the manner of cooperation between the base 11 and cap 12 and the associated bolts 14 and spacers 15. It will be noted that the apertures in the base 11 and cap 12 are suitably countersunk to provide for recessing the heads of bolts 14 and the cap 12, and also to provide for suitable recessing for the shoulders provided around the extremities of the spacers 15. It is to be noted that the spacers 15 are in this instance made of stainless steel and the selection of this material substantially overcomes the problem of temperature compensation as the spacers serve to control the relative motion between base 11 and cap 12 whereby temperature induced expansion or contraction will not affect the performance of the device.

The pressure responsive unit is mounted within the base 11 and cap 12 and the details of this unit and the manner of mounting are best shown by reference to Figure 2, which is a slightly exploded sectional view, in elevation, of the complete assembly. The pressure responsive unit comprises an expansible chamber having interconnected resilient end walls. These end walls are in the form of circularly corrugated dish shaped elements of thin resilient material and for convenience throughout the remainder of the specification will be referred to as diaphragms. The diaphragms 16, 17 have their outer peripheral edges 18, 19, respectively, turned down approximately 90° with respect to the surface of the diaphragm and each peripheral edge is provided with a flange 21, 22, respectively, for engagement with an upper plate 23 and a lower plate 24. Each of the plates 23, 24 is provided with annular rims 25, 26, respectively, co-operating with the flanges 21, 22, respectively, to hold the diaphragm in proper aligned position on the surfaces of the plates. Normally, the cavities formed by the rims 25, 26 and the co-operating peripheral edges of the diaphragms are filled with solder so that the diaphragms hermetically and rigidly engage the plates.

The plates 23, 24 are mounted in the cap 12 and base 11 so as to be maintained in substantially parallel spaced relationship. The specific manner of mounting the plates to the two-part frame will be described in detail later. It will be sufficient to say at this time that they are rigidly mounted and maintained in substantially spaced parallel relationship, the upper plate 23 remaining at all times in a fixed position with respect to the remainder of the assembly, and the lower plate 24 being so mounted as to move with respect to the upper plate 23 and the base 11 in a direction along the vertical axis of the assembly.

Referring now to the specific details of the expansible chamber, as said above, the diaphragms 16, 17 comprise the end walls of this chamber. The plates 23, 24 extend inward beneath diaphragms 16 and 17 and each plate is provided with a centrally located aperture. Located between the plates 23, 24 is the side wall of the expansible chamber and this side wall is in the form of a flexible metallic bellows 27 having its extremities nesting in the apertures provided in the plates 23, 24, the outer edges of the extremities being rolled over and suitably secured to and hermetically engaging with the plates 23, 24 by means of soldering or brazing.

It is to be noted that each of the diaphragms has a plurality of corrugations of substantially even depth, except for the inner corrugations which extend to a depth greater than any of the other corrugations. Although in this instance the outer corrugations extend to like depths, for some applications it might be desirable to vary slightly the depths. In all cases, however, the inner corrugation will extend to a depth greater than the depth of the outer corrugations. As best shown in Figures 6 and 7, the inner corrugations have a slope of approximately 45° to the vertical axis of the device and have their extremities 28, 29 turned up slightly and terminating in an aperture centrally located in each of the diaphragms so that a contact carrying member can be secured to each of the diaphragms. The contact carrying members are generally indicated at 31, 32, respectively, and are of the general type commonly referred to in the art as glass-to-metal terminals. These contact carrying members comprise centrally located electrically conducting rods 33, 34 to which are bonded surrounding sleeves of insulating material 35, 36, usually in the form of glass or the like. The insulating sleeves 35, 36 are in turn bonded to a pair of external supporting members 37, 38 which in turn are affixed to the diaphragms. The members 37, 38 are substantially L-shaped in cross section and are so constructed as to receive the turned up edges 28, 29 of the diaphragms and these co-operating parts are rigidly secured together by means of solder, thereby resulting in hermetic engagement of the contact carrying members with the diaphragms. The inner extremities of rods 33, 34 are suitably recessed to receive therein the electrical contacts 39, 41. The outer extremities of rods 33, 34 are provided with a peripheral groove for suitable connection thereto of the extremities of a pair of electrical leads 42, 43. The face of the contact 39 is shown as flat whereas the face of the contact 41 is shown as slightly curved.

From the above, it will be seen that an expansible chamber is provided by the mutual co-operation between the diaphragms 16, 17—the plates 23, 24—the bellows 27 and the contact carrying members 31, 32, all of which are rigidly connected and hermetically engage one another in the manner as described above. A suitable exhaust tubulation 40, the outer extremity of which is shown in Figure 1, is connected so as to connect with the interior of the expansible chamber as by means of an aperture through plate 23 (not shown). Normally, after the expansible chamber has been assembled, the interior volume is completely exhausted of air by means of suitable vacuum pulling equipment connected to exhaust tubulation 40. Upon completion of the evacuation, a small quantity of gas is permitted to flow back into the expansible chamber. In this instance, helium was selected although other gases or even air could be used. Enough gas is permitted to flow back until the residual pressure reaches about 50 millibars. The gas serves to give substantially complete temperature compensation throughout the normal range of temperatures and pressures to which the device is subjected.

Thus, it will be seen that the expansible chamber operates as an aneroid cell and its end walls will move an amount varying with the value of ambient atmospheric pressure. Assuming that the device is subjected to the relatively low atmospheric pressure at a relatively high altitude above the earth's surface, the diaphragms 16, 17 will be spaced by a predetermined amount in accordance with the setting of the device, to be described more fully below. As the device approaches the earth's surface, the external pressure will gradually increase, thereby causing the diaphragms to move together until ultimately the motion is sufficient to bring the contacts 39, 41 in engagement and thereby complete an electrical circuit through these contacts. During this period of deflection of the diaphragms, the loading on the diaphragms will continually increase by virtue of the increasing ambient pressure, and this loading will be distributed over the entire surface of the diaphragm and obviously will be concentrated at the center portion. Correspondingly, the deflection of the diaphragms will be great at the central portion; and if the device is subjected to a number of successive changes in pressure, there is a tendency for the center section of the diaphragm to be permanently deflected. That is to say, the metal may become bent from its original shape so that the contacts will not occupy the same position for successive values of equal pressure. Furthermore, as the pressure increases above the value for which the device is set to close the electrical circuit, the loading will build up on the center section of the diaphragm and will introduce strain in the middle which may cause permanent distortion of shape.

To overcome any tendency of the diaphragms to become permanently distorted by virtue of the loading thereon, the center section of the diaphragm has been purposely constructed in the form of an inverted truncated cone. This is readily seen by referring to Figures 6, 7 and noting the configuration of the inner corrguation. Starting at the peak of the inner corrugation, the side wall slopes downwardly at an angle of about 45° to the vertical axis of the device, terminating at a depth below the depth of the remainder of the corrugations. If the device is fully loaded, that is subject to seat level values of atmospheric pressure, the contacts within the expansible chamber will more likely be pressed firmly together, thus introducing strain in the diaphragms. By constructing the central section of the diaphragms in the form of an inverted truncated cone, any severe loading forces are taken in compression by virtue of the cone shape, thus minimizing any tendency of bending leading to permanent distortion of shape. The inverted cone shape carries the loading forces outwardly from the center of the diaphragm and distributes same over a greater radial area. This reduces the unit strain on the diaphragm, by virtue of the larger area, and prevents permanent distortion of shape.

It is to be noted that the diaphragms overlap the bellows, as seen in Figures 2 and 5, and this design has been purposely selected to permit ease of adjustment during the setting of the device, particularly at sea level values of atmospheric pressure. Of course, this overlapping of the bellows could be eliminated by using larger diameter bellows and having the extremities of the bellows connected to the peripheries of the diaphragms. Such an arrangement would be better from the standpoint of vibrational and gravity effects—however, with such an arrangement, the static loading on the diaphragms would be much greater and impose design problems if ease of adjustment for setting purposes were to be achieved. Some kind of force multiplying mechanism would be required, which of course, would add to the size and weight of the device. Furthermore, the diaphragm static loading should be reduced to a minimum because of the biasing load imposed upon pedestal 44 by means of pistons 67, the exact details of which will be described later on.

As stated heretofore, emphasis has been placed on an assembly that is compact, having a minimum size and weight, so that some means is necessary to produce the desired force multiplying effect without resorting to additional gears or the like. The simple and unique expedient of providing the side walls, having a diameter much smaller than the diameter of the diaphragms, readily resolves the problem for it is obvious that the static loading on the device is much less by virtue of the fact that forces acting upon the diaphragms are counterbalanced by forces acting on the plates, leaving only the loading on the central portion of the diaphragms, thereby substantially reducing the force requirement to move the lower plate for setting purposes. In order words, the diameter of the bellows determines the effective area of loading on the diaphragms which in turn determines the static forces developed.

The manner of setting the device, that is moving the lower plate with respect to the upper plate, independent of change in ambient pressure, can now be described and the manner in which this is accomplished will be readily seen upon referring to Figures 2, 4 and 5. Thus, the plate 24 is rigidly secured to a pedestal 44 by means of a plurality of screws 45. The lower extremity of the pedestal 44 is in the form of a threaded shaft 46 which threadably engages the inner surface of worm wheel 47 which in turn is mounted for rotation about the vertical axis of the device. The worm wheel 47 is provided with a hub 48 suitably journaled for rotation as by means of the bearing assembly 49, all of which is securely and rigidly mounted with respect to the base 11 by means of the axially located bolt 51 and cooperating nut 52. The plate 24 and the pedestal 44 are locked against any tendency to rotate about the vertical axis of the device by means of a plurality of dowel pins 53, one of which is shown in Figure 5. Dowel pins 53 also serve to maintain the expansible chamber assembly in a stable and secure position during periods of vibration. Apertures are provided in plate 24 and pedestal 44 for receiving the lower extremities of dowel pins 53 and apertures are provided in plate 23 and supporting ring 54 for the other extremities of dowel pins 53. The supporting ring 54 is suitably and rigidly secured to the cap 12 by means of a plurality of screws 55.

Worm wheel 47 is locked against any tendency to move axially by means of flanges overriding the outer edges of the bearing assembly 49, which in turn is locked against possible axial motion by means of the clamping action of bolt 51.

By holding the plate 24 and its associated pedestal 44 against rotation as described above, and by locking worm wheel 47 against possible axial motion, any rotation of the worm wheel 47 will cause the pedestal 44 to move in an axial direction, either up or down, depending upon the direction of rotation of the worm wheel 47. In other words, the threaded shaft 46 and the worm wheel 47 co-operate to provide a "jack" action for moving the plate 24 with respect to the base 11 and the plate 23.

Worm wheel 47 is driven by worm gear 56 suitably journaled for rotation in base 11 by means of bearings 57 and 58. The worm gear 56 is locked against axial motion by reason of the mounting arrangements for its inner extremity wherein same is provided with an annular shoulder 59 and a collar 61 abutting opposite surfaces of bearing 58. The outer extremity of worm gear 56 has a pinion 62 clamped thereto and engaging with pinion 63 suitably adapted for connection to an external setting means (not shown). Pinion 63 is journalled for rotation in base 11 by means of shaft 64 and bearings 65, 66. Any rotation of pinion 63 will be transmitted to pedestal 44 for changing the spacing of plates 23, 24 independently of changes in ambient fluid pressure.

Despite careful and precise machining of the cooperating threads on pedestal shaft 46 and worm wheel 47, there may be some play in these threads which of course could affect the accuracy of the device, particularly under conditions of severe vibration, on the order of 300 C. P. S., and/or gravity forces 10 times the acceleration of gravity. To overcome this possible thread-play, pedestal 44 is permanently biased in a direction toward plate 23. The biasing effect is accomplished by means of a plurality of pistons 67 engaging the pedestal 44 and each urged against same by means of compression springs 68, these arrangements being clearly shown in Figure 5. A plurality of caps 69 provide a restraining wall for the lower extremity of springs 68 and also provide a bore for slidably receiving the piston rods 71. Pistons 67 have a groove 72 in which "O-rings" 73 are confined for the purpose of preventing side play in pistons 67 during vibration. The plurality of spring biased pistons 67 have a loading on the order of 90 pounds each and this force must be overcome during setting operations—as heretofore explained, this biasing force adds to the static loading on the diaphragms and is an important factor influencing the use of diaphragms overlapping the connecting bellows.

From the above, it will be seen that a balanced, sensitive expansible chamber is provided for accurate and precise electrical switching over a range of about 20,000 feet having a maximum error of ±2 millibars. The chamber is rigidly mounted on a heavy two-part frame and is substantially free from errors resulting from temperature changes over a range of 0° F. to 120° F.; free from errors resulting from vibration up to 300 cycles per second; and free from the effects of gravity and acceleration forces ten times the acceleration of gravity. The switching is done in an hermetically sealed enclosure and is adjustable over a wide range in altitude.

What is claimed and desired to be secured by United States Letters Patents is:

1. Pressure responsive apparatus comprising, in combination: a first and a second resilient wall moveable in response to changes in fluid pressure; means for supporting said walls in spaced parallel relationship; means interconnecting the peripheral edges of said first and second walls to form an expansible chamber; electrical switching means within said chamber and adapted to be actuated by movement of said walls; and means for moving one of said resilient walls bodily with respect to the other of said resilient walls for varying the spacing of said first and second walls independently of changes in fluid pressure.

2. Pressure responsive apparatus comprising, in combination: an expansible chamber having resilient end walls and a side wall, said end walls being moveable in response to changes in fluid pressure; means for supporting said end walls in spaced parallel relationship; electrical switching means within said chamber and adapted to be actuated by movement of said end walls; and means for moving one of said resilient end walls bodily with respect to the other of said resilient end walls for varying the spacing of said end walls independently of changes in fluid pressure.

3. Pressure responsive apparatus comprising, in combination: a substantially cylindrical expansible chamber having resilient end walls and a side wall, said end walls being moveable in response to changes in fluid pressure; means for supporting said end walls in spaced parallel relationship; electrical switching means within said chamber and adapted to be actuated by movement of said end walls; and means for moving one of said resilient end walls bodily with respect to the other of said resilient end walls for varying the spacing of said end walls independently of changes in fluid pressure.

4. Pressure responsive apparatus comprising, in combination an expansible chamber having resilient end walls and a side wall, said end walls being moveable in response to changes in fluid pressure; means for supporting said end walls in spaced parallel relationship; electrical switching means within said chamber and adapted to be actuated by movement of said end walls; and means for varying the spacing of said end walls independently of changes in fluid pressure, said side wall being resilient to permit the said variation in spacing of said end walls.

5. Pressure responsive apparatus comprising, in combination: an expansible chamber having resilient end walls and a side wall, said end walls being moveable in response to changes in fluid pressure, said side wall comprising a substantially cylindrical flexible metallic bellows; means for supporting said end walls in spaced parallel relationship; electrical switching means within said chamber and adapted to be actuated by movement of said end walls; and means for varying the spacing of said end walls independently of changes in fluid pressure.

6. Pressure responsive apparatus comprising, in combination a substantially cylindrical expansible chamber having resilient end walls and a side wall, said end walls being moveable in response to changes in fluid pressure, said side wall comprising a substantially cylindrical flexible metallic bellows, said bellows having a diameter substantially smaller than the diameter of said end walls, means for supporting said end walls in spaced parallel relationship, said last named means serving to connect said bellows to said end walls; electrical switching means within said chamber and adapted to be actuated by movement of said end walls; and means for varying the spacing of said end walls independently of changes in fluid pressure.

7. Pressure responsive apparatus comprising, in combination: a substantially cylindrical expansible chamber having resilient end walls and a substantially cylindrical side wall, said end walls being moveable in response to changes in fluid pressure, said cylindrical side wall having a diameter substantially smaller than the diameter of said end walls, means for supporting said end walls in spaced parallel relationship, said last named means serving to connect said side wall to said end walls; electrical switching means within said chamber and adapted to be actuated by movement of said end walls; and means for varying the spacing of said end walls independently of changes in fluid pressure, said side wall being resilient to permit variation in the spacing of said end walls.

8. Pressure responsive apparatus comprising, in combination: a substantially cylindrical expansible chamber having resilient end walls and a cylindrical side wall, said end walls being moveable in response to changes in fluid pressure, said side wall having a diameter substantially smaller than the diameter of said end walls; means for supporting said end walls in spaced parallel relationship; means for connecting said side wall to said end walls; electrical switching means within said chamber and adapted to be actuated by movement of said end walls; and means for varying the spacing of said end walls independently of changes in fluid pressure, said side wall being resilient to permit variation in the spacing of said end walls.

9. Pressure responsive apparatus comprising, in combination: an expansible chamber having end walls and a side wall, said end walls comprising identical dish-shaped diaphragms of thin resilient metal moving in opposite directions in response to variations in fluid pressure, each of said diaphragms having a series of concentrically arranged corrugations of even depth surrounding a centrally located aperture; the inner end of said corrugations terminating at said diaphragm aperture and extending to a depth greater than the depth of the remainder of said corrugations, said inner corrugation having a slope inclined to the center axis of said diaphragm, contact carrying members extending through said apertures and hermetically secured to said diaphragms; and electrical contacts secured to each of said contact carrying members and adapted to make or break in response to movement of said diaphragms.

10. Pressure responsive apparatus comprising, in combination: a pair of resilient diaphragms moveable in response to changes in fluid pressure; means for supporting said diaphragms in spaced parallel relationship; means interconnecting the peripheries of said diaphragms to form an expansible chamber; electrical switching means within said chamber and adapted to be actuated by movement of said diaphragms, said diaphragms moving in opposite directions upon changes in fluid pressure; and means for moving one of said diaphragms bodily with respect to the other of said diaphragms for varying the spacing of said diaphragms independently of changes in fluid pressure.

11. Pressure responsive apparatus comprising, in combination: a frame, a first plate and a second plate mounted on said frame, said plates being substantially parallel and spaced apart, said second plate being moveable with respect to said first plate in a direction substantially perpendicular to their surfaces; an aperture centrally located in each of said plates; a first and a second identical annular dish-shaped diaphragm of thin resilient metal affixed to the outer surface of said first and second plates, respectively, said diaphragms overlaying and surrounding said apertures; a flexible bellows between said plates surrounding said apertures and having its ends hermetically engaging the surfaces of said plates to thereby form an expansible chamber; and a first and a second electrical contact within said chamber and carried by said first and second diaphragms, respectively, said contacts engaging one another in response to movement of said diaphragms corresponding to a predetermined value of ambient fluid pressure.

12. The combination defined in claim 11 wherein said diaphragms have a diameter greater than the diameter of said bellows.

13. The combination defined in claim 12 wherein each of said diaphragms has a series of concentrically arranged corrugations of even depth surrounding a centrally located aperture, the inner end of said corrugations terminating at said diaphragm aperture and extending to a depth greater than the depth of the remainder of said corrugations, said inner corrugation having a slope inclined to the center axis of said diaphragm, and each of said diaphragms has electrical contact carrying members extending through said diaphragm apertures and hermetically secured to said diaphragms.

14. The combination defined in claim 13 wherein the outer corrugations of each of said diaphragms is turned down to form a right angle with each of said plates and has its extreme peripheral edge in the form of a flange resting on and hermetically engaging each of said plates.

15. The combination defined in claim 14 wherein the means for moving said second plate with respect to said first plate comprise: a worm wheel mounted on said frame for rotation about the said center axis of said diaphragms; a worm gear engaging said worm wheel and mounted for rotation in said frame, said worm gear having means extending externally from said frame for rotating same, said worm wheel having an annular threaded section; and a pedestal support for said second plate having an annular threaded section co-operating with the threaded section of said worm wheel whereby rotation of said wheel imparts rectilinear movement of said pedestal along the axis of said diaphragms.

16. The combination defined in claim 15 wherein a fixed biasing force is applied to said pedestal of sufficient magnitude and proper direction so as to eliminate any play in the said co-operating threaded section.

17. The combination claimed in claim 16 wherein said biasing force is applied to said pedestal by means of a series of piston members bearing on the underside of the table of said pedestal, and said piston members are urged against said pedestal by means of normally compressed springs having one end bearing on the non-working side of the piston member and the other end adjustably retained within said frame.

18. The combination defined in claim 17 wherein said first and second plates are dowelled together to prevent any tendency of the plates to move with respect to each other in a direction parallel to their surfaces.

19. Pressure responsive apparatus comprising, in combination: a substantially, completely evacuated expansible chamber having end walls and a resilient side wall, said end walls comprising identical dish-shaped diaphragms of thin resilient metal moving in opposite directions in response to variations in fluid pressure, electrical switching means within said chamber adapted to be actuated by movement of said diaphragms corresponding to a pre-determined value of ambient fluid pressure, and means for varying the spacing of said diaphragms independently of changes in fluid pressure whereby the actuation of said switching means may be selectively varied over a range of fluid pressure.

20. The combination defined in claim 19 wherein the diameter of said side wall is smaller than the diameter of said diaphragms to reduce the static loading on said diaphragms.

21. Pressure responsive apparatus comprising, in combination: a frame, a first plate and a second plate mounted on said frame, said plates being aperture centrally located in each of said plates; a first and a second identical annular dish-shaped diaphragm of thin resilient metal affixed to the outer surface of said first and second plates, respectively, said diaphragms overlaying and surrounding said apertures; a resilient side wall between said plates surrounding said apertures and having its ends hermetically engaging the surfaces of said plates to thereby form an expansible chamber; and a first and a second electrical contact within said chamber and carried by said first and second diaphragm, respectively, said contacts engaging one another in response to movement of said diaphragms corresponding to a predetermined value of ambient fluid pressure.

22. The combination defined by claim 21 in which the resilient side wall is in the form of a flexible bellows.

23. Pressure responsive apparatus comprising, in combination: an expansible chamber having resilient end walls and a side wall, said end walls being movable in response to changes in fluid pressure, means for supporting said end walls in substantially spaced parallel relationship, electrical switching means adapted to be actuated by movement of said end walls, and means for varying the spacing of said end walls independently of changes in fluid pressure, said side wall being resilient to permit the said variation in spacing of said end walls.

24. Pressure responsive apparatus comprising, in combination: an expansible chamber having resilient end walls and a side wall, said end walls being movable in response to changes in fluid pressure, means for supporting said end walls in substantially spaced parallel relationship, electrical switching means within said chamber and adapted to be actuated by movement of said end walls, and means for varying the spacing of said end walls independently of changes in fluid pressure, said side wall being resilient to permit the said variation in spacing of said end walls.

25. Pressure responsive apparatus comprising, in combination: a pair of resilient diaphragms movable in response to changes in fluid pressure, means for supporting said diaphragms in substantially spaced parallel relationship, means interconnecting the peripheries of said diaphragms to form an expansible chamber, control means located in proximity to said diaphragms and adapted to be actuated by movement of said diaphragms, said diaphragms moving in opposite directions upon changes in fluid pressure, and means for moving one of said diaphragms bodily with respect to the other of said diaphragms for varying the spacing of said diaphragms independently of changes in fluid pressure.

26. Pressure responsive apparatus comprising, in combination: a pair of resilient diaphragms movable in response to changes in fluid pressure, means for supporting said diaphragms in substantially spaced parallel relationship, means interconnecting the peripheries of said diaphragms to form an expansible chamber, electrical control means located in proximity to said diaphragms and adapted to be actuated by movement of said diaphragms, said diaphragms moving in opposite directions upon changes in fluid pressure, and means for moving one of said diaphragms bodily with respect to the other of said diaphragms for varying the spacing of said diaphragms independently of changes in fluid pressure.

BRUCE H. DUNMYER.
LOUVAN E. WOOD.

References Cited in the file of this patent

UNITED STATES PATENTS

| Number | Name | Date |
|---|---|---|
| 1,780,179 | Ellicott | Nov. 4, 1930 |
| 2,061,079 | Lacoe | Nov. 17, 1936 |
| 2,450,961 | Heymann et al. | Oct. 12, 1948 |
| 2,481,612 | Nicholson | Sept. 13, 1949 |
| 2,582,483 | Hallerberg | Jan. 5, 1952 |
| 2,645,248 | Baker | July 14, 1953 |
| 2,648,732 | Starbird | Aug. 11, 1953 |

FOREIGN PATENTS

| Number | Country | Date |
|---|---|---|
| 166,562 | Great Britain | July 11, 1921 |
| 674,851 | France | Oct. 28, 1929 |